United States Patent
Branagan et al.

(10) Patent No.: US 12,509,895 B2
(45) Date of Patent: *Dec. 30, 2025

(54) COMBINATION STEP BOLT AND FALL PROTECTION ANCHORAGE ASSEMBLIES

(71) Applicant: Crown Castle USA Inc., Canonsburg, PA (US)

(72) Inventors: Matt Branagan, Canonsburg, PA (US); James Ruedlinger, Evansville, IN (US); Kerry Johnson, Glide, OR (US); Christian Beauchamp, Mountain Home, ID (US)

( * ) Notice: Subject to any disclaimer, the term of this patent is extended or adjusted under 35 U.S.C. 154(b) by 659 days.

This patent is subject to a terminal disclaimer.

(21) Appl. No.: 17/021,609

(22) Filed: Sep. 15, 2020

(65) Prior Publication Data
US 2020/0407988 A1 Dec. 31, 2020

Related U.S. Application Data

(63) Continuation of application No. 15/727,017, filed on Oct. 6, 2017, now Pat. No. 10,781,598.

(60) Provisional application No. 62/404,949, filed on Oct. 6, 2016.

(51) Int. Cl.
| | | |
|---|---|---|
| *E04G 21/32* | (2006.01) | |
| *A62B 35/00* | (2006.01) | |
| *E04H 12/00* | (2006.01) | |
| *E06C 7/18* | (2006.01) | |
| *E06C 9/04* | (2006.01) | |
| *E04C 3/30* | (2006.01) | |

(52) U.S. Cl.
CPC ...... *E04G 21/3276* (2013.01); *A62B 35/0068* (2013.01); *E04H 12/00* (2013.01); *E06C 7/18* (2013.01); *E06C 9/04* (2013.01); *E04C 3/30* (2013.01)

(58) Field of Classification Search
CPC . E04G 21/3276; A62B 35/0068; A62B 27/00; E04H 12/00; E06C 7/18; E06C 9/04; E04C 3/30; Y10T 403/7111; Y10T 403/7164
See application file for complete search history.

(56) References Cited

U.S. PATENT DOCUMENTS

| | | | | |
|---|---|---|---|---|
| 2,443,362 | A * | 6/1948 | Tinnerman | E05B 9/084 248/65 |
| 2,476,863 | A * | 7/1949 | Hawes | E04G 7/24 403/395 |
| 3,042,353 | A * | 7/1962 | O'Mara | F16L 3/1033 D8/364 |
| 3,300,850 | A * | 1/1967 | Steuernagel | B03C 3/40 96/92 |
| 3,301,513 | A * | 1/1967 | Sugaya | F16L 3/24 248/228.6 |

(Continued)

*Primary Examiner* — Colleen M Chavchavadze
*Assistant Examiner* — Shiref M Mekhaeil
(74) *Attorney, Agent, or Firm* — Blank Rome LLP (57) ABSTRACT

Combination step bolt and fall protection anchorage assemblies are disclosed that may be mounted on structures such as communication towers, poles and antennas. The assemblies include a mounting plate that can be bolted to the structure, an integrated anchorage clip connected to the mounting plate having at least one safety hook hole extending therethrough, and a step bolt secured to the integrated anchorage clip.

19 Claims, 6 Drawing Sheets

(56) References Cited

U.S. PATENT DOCUMENTS

| | | | | |
|---|---|---|---|---|
| 3,399,746 A * | 9/1968 | Wood | E06C 9/04 | 182/189 |
| 3,408,780 A * | 11/1968 | Brister | E04D 1/30 | 248/237 |
| 3,535,751 A * | 10/1970 | Batchelor | A01B 15/00 | 403/395 |
| 4,321,745 A * | 3/1982 | Ford | F24S 25/61 | 29/525.04 |
| 4,516,992 A * | 5/1985 | Jonelis | B03C 3/86 | 96/87 |
| 4,655,423 A * | 4/1987 | Schavilje | B25D 5/00 | 227/3 |
| 4,765,574 A * | 8/1988 | Thomas | A63B 29/024 | 248/694 |
| 4,867,596 A * | 9/1989 | Ocuin | F16B 12/40 | 403/395 |
| 4,932,497 A * | 6/1990 | Raso | E06C 9/04 | 182/189 |
| 4,998,841 A * | 3/1991 | Wilde | F16B 7/044 | 403/395 |
| 5,156,233 A * | 10/1992 | Olsen | E04G 21/3276 | 182/3 |
| 5,287,670 A * | 2/1994 | Funaki | E04D 3/3608 | 52/520 |
| 5,544,717 A * | 8/1996 | White | A62B 35/0068 | 182/90 |
| 5,687,535 A * | 11/1997 | Rohlf | E04D 13/12 | 52/27 |
| 5,699,875 A * | 12/1997 | Dugan | A62B 35/0068 | 52/27 |
| 6,068,226 A * | 5/2000 | Anders | A63B 29/025 | 248/231.91 |
| 6,336,260 B1 * | 1/2002 | Mauthner | F16B 45/02 | 24/599.6 |
| 6,378,822 B1 * | 4/2002 | Franks | E06C 1/34 | 182/92 |
| 7,559,511 B2 * | 7/2009 | Yon | F16L 3/237 | 248/65 |
| 8,109,048 B2 * | 2/2012 | West | F24S 25/20 | 52/173.3 |
| 8,153,700 B2 * | 4/2012 | Stearns | E04B 1/66 | 52/173.1 |
| 8,387,752 B2 * | 3/2013 | Lagerstedt | E04G 21/3261 | 182/87 |
| 8,453,794 B2 * | 6/2013 | Melic | E04G 21/3276 | 52/703 |
| 8,627,617 B2 * | 1/2014 | Haddock | F24S 25/615 | 52/173.3 |
| 8,756,881 B2 * | 6/2014 | West | F24S 25/40 | 52/173.3 |
| 8,894,329 B1 * | 11/2014 | Kekahuna | E04B 1/4157 | 405/259.4 |
| 9,004,415 B2 * | 4/2015 | Fukumoto | F16B 19/1081 | 248/51 |
| 9,531,319 B2 * | 12/2016 | Braunstein | F24S 25/00 | |
| 9,660,570 B2 * | 5/2017 | Stephan | F16B 5/0028 | |
| 9,669,906 B2 * | 6/2017 | Carnevali | E05B 73/007 | |
| 9,856,900 B1 * | 1/2018 | Strange | A62B 35/0068 | |
| 9,876,462 B2 * | 1/2018 | Hudson | H02S 20/23 | |
| 9,985,575 B2 * | 5/2018 | Stearns | H02S 20/23 | |
| 10,277,158 B2 * | 4/2019 | Stephan | H02S 20/23 | |
| 10,320,325 B1 * | 6/2019 | Atia | H02S 30/10 | |
| 10,340,837 B2 * | 7/2019 | Wildes | F24S 25/636 | |
| 10,413,762 B2 * | 9/2019 | Patton | A62B 35/0037 | |
| 10,478,645 B2 * | 11/2019 | Maurice | A63B 29/024 | |
| 10,576,315 B2 * | 3/2020 | Pascoe | F16B 45/002 | |
| 10,718,125 B2 * | 7/2020 | Lopez | E04G 21/3214 | |
| 10,731,355 B2 * | 8/2020 | Haddock | F24S 25/636 | |
| 10,737,126 B1 * | 8/2020 | Aleksovski | E04G 21/328 | |
| 10,746,324 B1 * | 8/2020 | Roth | F16G 11/143 | |
| 10,756,668 B2 * | 8/2020 | Bamat | H02S 30/00 | |
| 10,780,300 B2 * | 9/2020 | Warren | F16B 2/08 | |
| 10,840,850 B1 * | 11/2020 | Atia | F24S 25/15 | |
| 10,883,263 B1 * | 1/2021 | Fujisaki | E04B 1/26 | |
| 10,890,205 B2 * | 1/2021 | McPheeters | F16B 33/004 | |
| 10,903,785 B2 * | 1/2021 | Haddock | H02S 30/00 | |
| 11,519,189 B2 * | 12/2022 | Leonard | E04B 1/36 | |
| 2004/0035637 A1 * | 2/2004 | Skipper | E06C 7/006 | 182/100 |
| 2006/0075691 A1 * | 4/2006 | Verkamp | E04D 13/10 | 52/24 |
| 2007/0278464 A1 * | 12/2007 | Constant | B60P 1/5471 | 254/1 |
| 2011/0214367 A1 * | 9/2011 | Haddock | F24S 25/615 | 52/173.3 |
| 2011/0272545 A1 * | 11/2011 | Liu | F24F 13/32 | 248/222.14 |
| 2015/0288320 A1 * | 10/2015 | Stearns | F24S 25/60 | 52/173.3 |
| 2017/0080873 A1 * | 3/2017 | Forhan | B60D 1/58 | |
| 2017/0138533 A1 * | 5/2017 | Maurice | A62B 35/0068 | |
| 2017/0361135 A1 * | 12/2017 | Crookston | A62B 35/0068 | |
| 2018/0117374 A1 * | 5/2018 | Pascoe | A62B 35/04 | |
| 2018/0133526 A1 * | 5/2018 | Warren | E06C 9/04 | |
| 2020/0003184 A1 * | 1/2020 | Garcia | E04H 9/0237 | |
| 2020/0115959 A1 * | 4/2020 | Cohen | E06C 7/186 | |

\* cited by examiner

COMBINATION STEP BOLT AND FALL PROTECTION ANCHORAGE ASSEMBLIES

CROSS-REFERENCE TO RELATED APPLICATION

This is a continuation of U.S. application Ser. No. 15/727,017, filed 6 Oct. 2017, which claims priority from U.S. Provisional Application No. 62/404,949 filed Oct. 6, 2016, which are both incorporated herein by reference.

FIELD OF THE INVENTION

The present invention relates to combination step bolt and fall protection anchorage assemblies for use on structures, such as communication towers, poles and antennas.

BACKGROUND INFORMATION

Step bolts are typically mounted on structures that contain communication or electrical transmission equipment to be used as steps. Conventional structures that contain communication or electrical transmission equipment are constructed to have clips welded thereon for engaging step bolts along their heights. Step bolts are typically mounted on such structures in holes, e.g., by installing a threaded step bolt directly into a hole in a welded clip and securing it with two nuts, one on each side of the clip.

SUMMARY OF THE INVENTION

The present invention provides combination step bolt and fall protection anchorage assemblies that may be mounted on structures such as communication towers, poles and antennas. The assemblies include a mounting plate that can be bolted to the structure, an integrated anchorage clip connected to the mounting plate having at least one safety hook hole extending therethrough, and a step bolt secured to the integrated anchorage clip.

An aspect of the present invention provides a combination step bolt and fall protection anchorage assembly for mounting on structures. The assembly comprises a mounting plate, an integrated anchorage clip secured to the mounting plate comprising at least one safety hook hole extending therethrough, and a step bolt secured to the integrated anchorage clip and extending away from the mounting plate in a direction substantially perpendicular to a plane defined by the mounting plate.

Another aspect of the present invention provides a structure comprising multiple combination step bolt and fall protection anchorage assembles mounted thereon. Each assembly comprises a mounting plate, an integrated anchorage clip secured to the mounting plate comprising at least one safety hook hole extending therethrough, and a step bolt secured to the integrated anchorage clip and extending away from the mounting plate in a direction substantially perpendicular to a plane defined by the mounting plate.

These and other aspects of the present invention will be more apparent from the following description.

DETAILED DESCRIPTION

The present invention provides combination step bolt and fall protection anchorage assemblies for structures that contain communication or electrical transmission equipment. As used herein, the term "structure" may refer to cellular towers, communication towers, monopoles, utility poles, lattice structures, antennas, or any vertical structure. The structure may be of any known design and may typically be made of metal, wood, concrete, composites, or the like.

Figure 1:
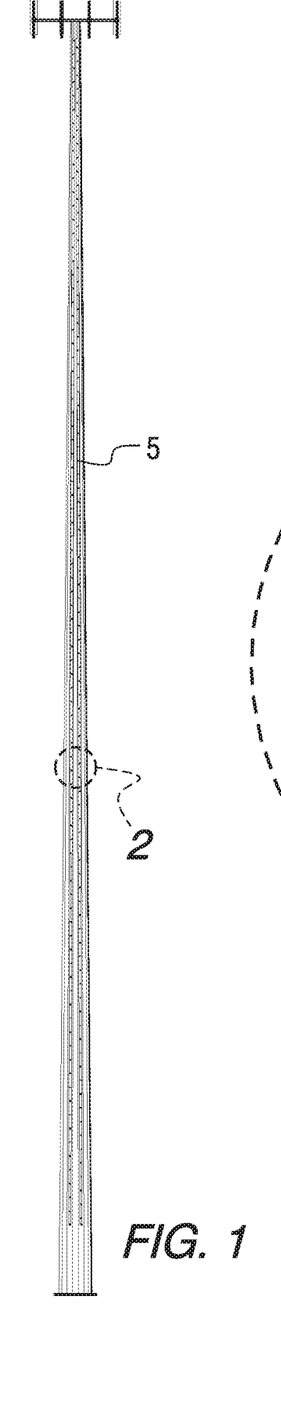
FIG. 1 is a profile or side view of a support structure in the form of a monopole communication tower including combination step bolt and fall protection anchorage assemblies in accordance with an embodiment of the present invention.
Figure 2:
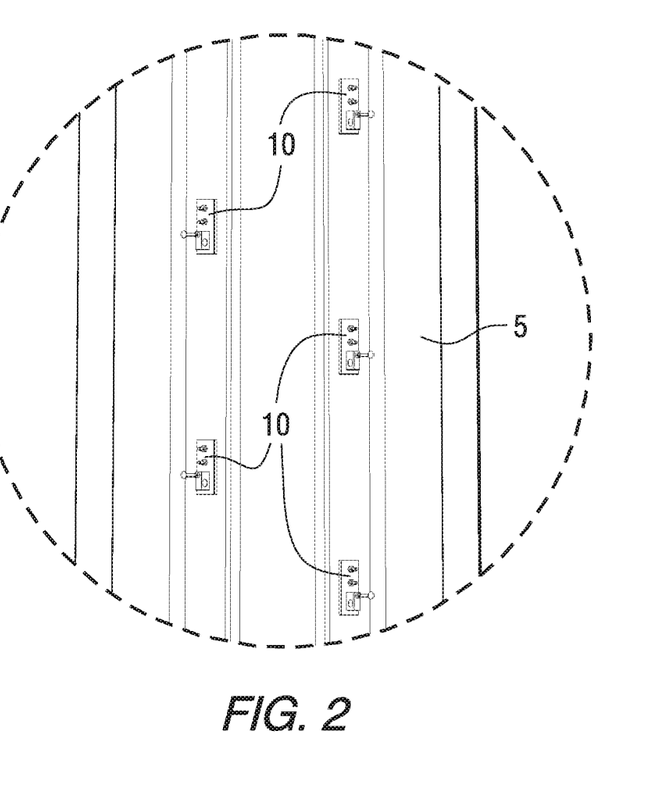
FIG. 2 is a magnified view of a portion of the support structure shown in FIG. 1.
Figure 3:
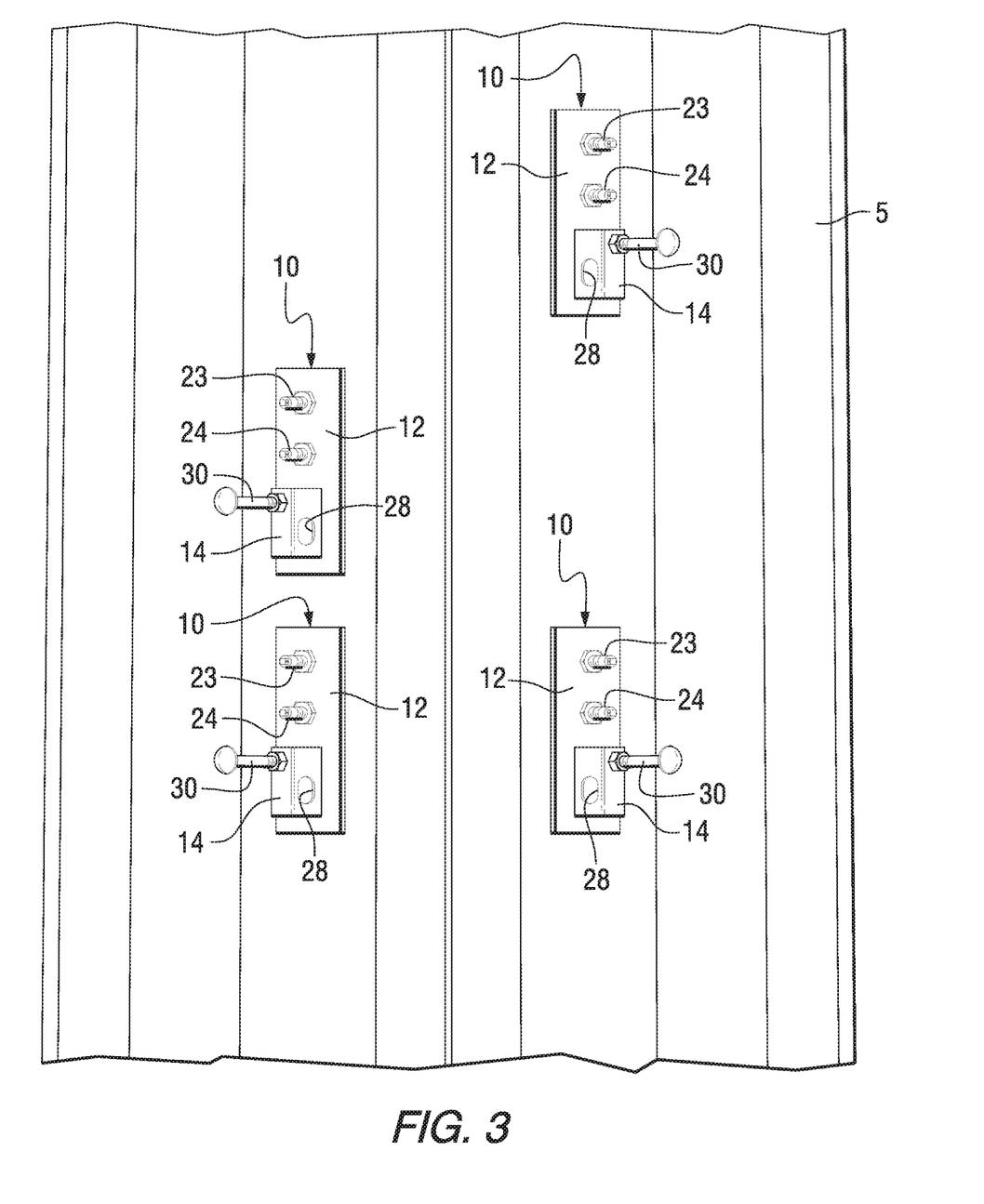
FIG. 3 is a side view of a portion of a support structure including multiple combination step bolt and fall protection anchorage assemblies in accordance with an embodiment of the present invention.

FIG. 1 illustrates a support structure 5 in the form of a monopole communication tower upon which combination step bolt and fall protection anchorage assemblies 10 may be installed in accordance with an embodiment of the present invention. The assemblies 10 can be used for new structure construction or to retrofit existing structures. FIG. 2 is a magnified portion of the support structure 5 of FIG. 1, illustrating multiple combination step bolt and fall protection anchorage assemblies 10 installed thereon. FIG. 3 is a further magnified view showing multiple assemblies 10 installed on the support structure 5. The series of combination step bolt and fall protection anchorage assemblies 10 may be mounted to the structure 5 to provide a means for climbing the structure 5. The combination step bolt and fall protection anchorage assemblies 10 near the technician may also serve as fall protection anchorage for the safety hook of the technician's climbing lanyard(s) for maintaining complete tie-off through use of the fall protection anchorages alone, as a secondary backup to the primary fall protection system, or as an alternative fall protection anchorage to facilitate working at locations away from the primary fall protection system. The combination step bolt and fall protection anchorage assemblies 10 provide for easily installable fall protection devices at desired locations. The assemblies 10 may be spaced vertically above each other any suitable distance, for example, up to 48 inches, or from 6 to 42 inches, or from 12 to 40 inches.

Figure 4:
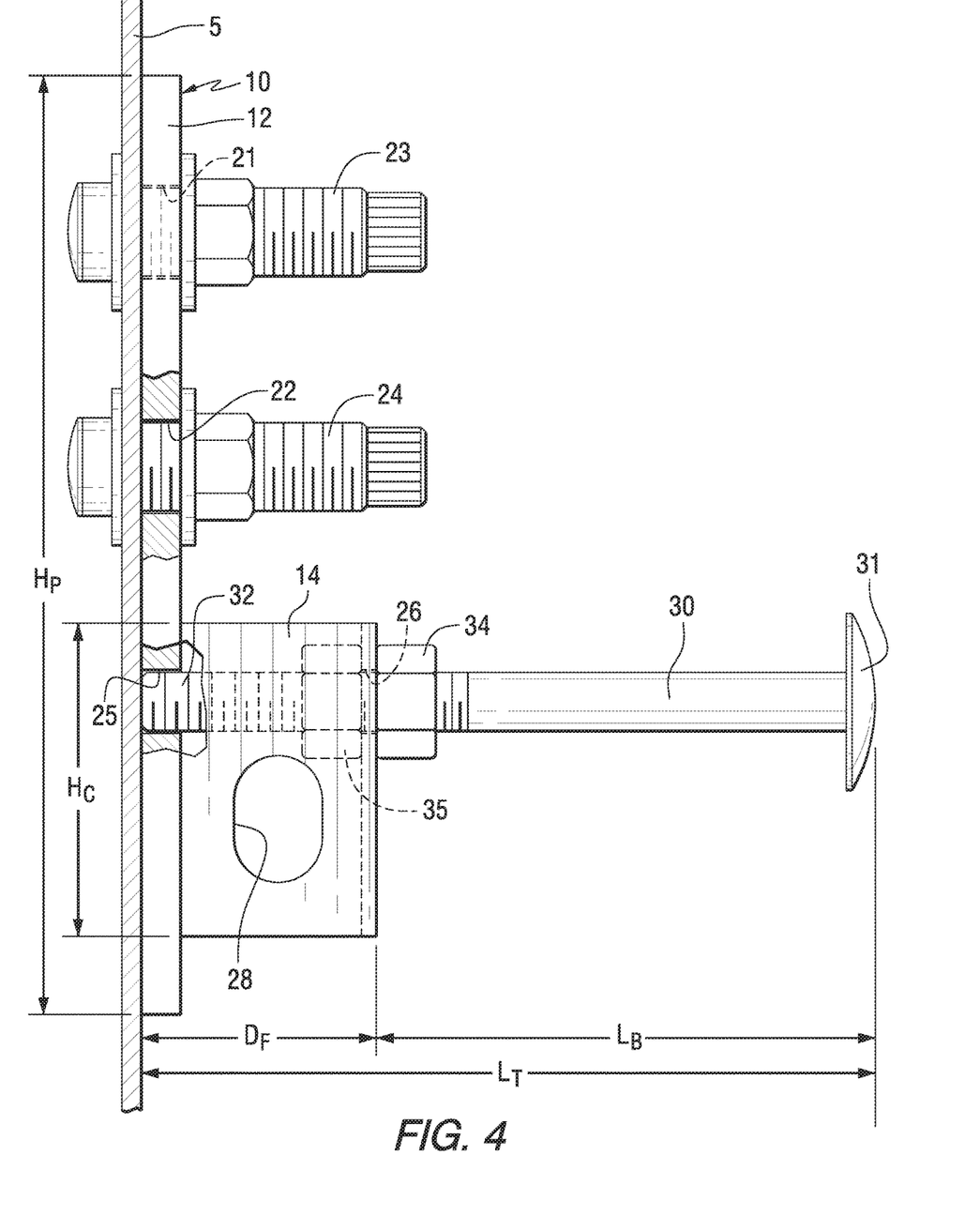
FIG. 4 is a side view of a combination step bolt and fall protection anchorage assembly secured to a support structure in accordance with an embodiment of the present invention.
Figures 5, 6, 7, 8:
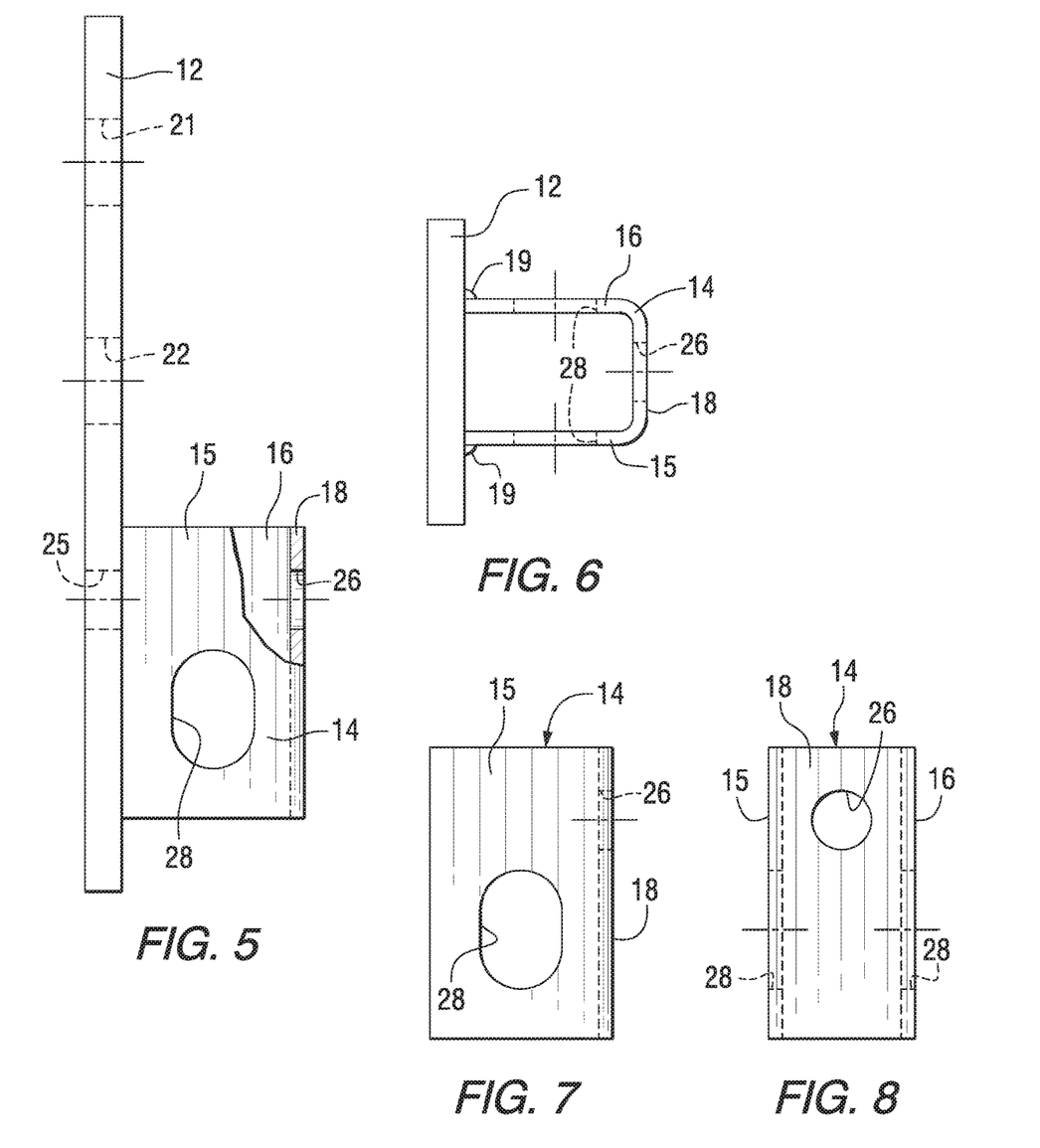
FIG. 5 is a side view of a mounting plate and integrated anchorage clip of a combination step bolt and fall protection anchorage assembly in accordance with an embodiment of the present invention.
FIG. 6 is a top view of the mounting plate and integrated anchorage clip of FIG. 5.
FIG. 7 is a side view of the integrated anchorage clip of FIG. 5.
FIG. 8 is a front view of the integrated anchorage clip of FIG. 5.

FIGS. 4-8 and 10 illustrate details of a combination step bolt and fall protection anchorage assembly 10 in accordance with an embodiment of the present invention. The assembly 10 includes a mounting plate 12 having an integrated anchorage clip 14 mounted thereon. The integrated anchorage clip 14 includes a first side panel 15, a second side panel 16, and a face plate 18. In the embodiment shown, the first and second side panels 15 and 16, and the face plate 18, form a channel having a generally U-shaped cross section. The integrated anchorage clip 14 may be secured to the mounting plate 12 by any suitable means, for example, by welds 19 as shown in FIG. 6. However, any other suitable type of attachment may be used, e.g., with mechanical fasteners, a slot connection or the like. In certain embodiments, the integrated anchorage clip 14 and the mounting plate 12 may be integrally formed.

As shown in FIG. 4, the mounting plate 12 has a height $H_P$, and the integrated anchorage clip 14 has a height $H_C$. The mounting plate height $H_P$ may typically range from 6 to 24 inches, for example, from 8 to 18 inches, or from 10 to 12 inches. The integrated anchorage clip height $H_C$ may typically range from 2 to 8 inches, for example, from 2 to 4 inches. The thickness of the mounting plate 12 may typically range from 0.25 to 1.25 inches, for example, from 0.375 to 1 inch, or about 0.75 inch. The thickness of the integrated anchorage clip 14 may typically range from 0.125 to 1.25 inches, for example, from 0.125 to 0.375 inch, or about 0.1875 inch.

An upper hole 21 is provided through the mounting plate 12, and a lower hole 22 is provided through the mounting plate 12. An upper fastener mounting bolt 23 is provided through the upper hole 21 and a lower fastener bolt 24 is provided through the lower hole 22. The upper and lower fastener bolts 23 and 24 may be provided in the form of conventional blind bolts in the embodiment shown in FIG. 4. However, it is to be understood that any other suitable type of bolt or mechanical fastener may be used. Furthermore, any other suitable number of fastener bolts may be used, including a single fastener, or three or more fasteners. Although the mounting plate 12 may alternatively be welded to the support structure 5 without the use of mechanical fasteners, the use of mechanical fasteners provides advantages of less risk from fire due to welding, less damage to protective coatings of the structures such as galvanization, and increased efficiently of installation and inspection.

As shown in FIGS. 4 and 5, a step bolt hole 25 is provided through the mounting plate 12. As more fully described below, the step bolt hole 25 may be unthreaded and receives the threaded end of a step bolt. As shown in FIGS. 4-8, the integrated anchorage clip 14 includes an unthreaded step bolt hole 26 through the face plate 18. Alternatively, the step bolt hole 26 in the front face 18 of the U-shaped integrated anchorage clip 14 may be threaded to engage the threaded portion of the step bolt 30 or the mounting plate 12 may be threaded to serve as the step bolt 30 attachment point.

Safety hook holes 28 are provided through the side panels 15 and 16 for receiving a safety hook, as more fully described below. In the embodiment shown, the safety hook holes 28 are vertically elongated. However, any other suitable hole shape may be used.

Figure 10:
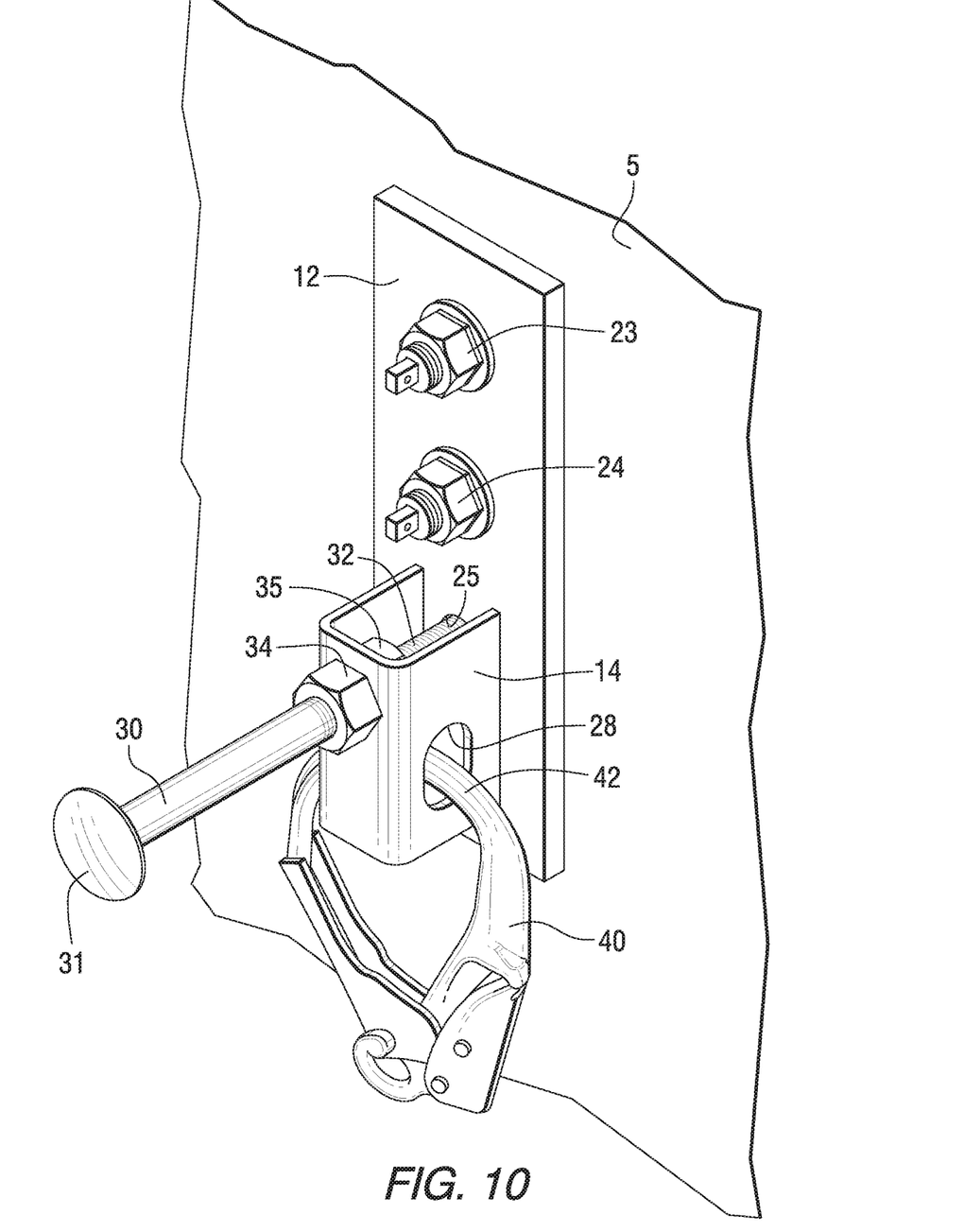
FIG. 10 is an isometric view of a combined step bolt and fall protection anchor assembly having a safety hook mounted thereon in accordance with an embodiment of the present invention.

As shown in FIGS. 4 and 10, the assembly 10 includes a step bolt 30 having a head 31 at one end and an opposite threaded end 32. The step bolt 30 passes through the step bolt hole 26 of the face plate 18, and also extends into the step bolt hole 25 of the mounting plate 12. An exterior threaded nut 34 is threaded onto the step bolt 30 against the exterior surface of the face plate 18. An interior threaded nut 35 is threaded on the step bolt 30 against an interior face of the face plate 18.

In the embodiment shown, the safety hook holes 28 extend through the first and second side walls 15 and 16 of the integrated anchorage clip 14 at a height that is vertically below the height of the step bolt hole 26 extending through the face plate 18. This arrangement provides safety hook holes 28 below the step bolt 30 of each assembly 10.

As shown in FIG. 4, the face plate 18 of the integrated anchorage clip 14 extends a distance $D_F$ from the rear surface of the mounting plate 12. The extended distance $D_F$ may typically range from 1 to 5 inches, for example, from 2 to 4 inches. The step bolt 30 has an exposed length $L_B$ measured from the exterior surface of the face plate 18 to the end of the head 31. The step bolt 30 also has a total length $L_T$ measured from the exterior surface of the support structure 5 to the end of the head 31. The exposed length $L_B$ may typically range from 4 to 9 inches, for example, from 5 to 8 inches. The integrated anchorage clip 14 has a depth sufficient to accommodate the threaded portion of the step bolt 30 and the interior threaded nut 35. In the embodiment shown, the step bolt 30 is threadingly engaged with interior and exterior nuts 35 and 34; however, any other suitable type of arrangement may be used, e.g., clips, pins, adhesive or the like.

The extended distance $D_F$ of the face plate 18 provides several advantages over conventional step bolt designs. For example, the extended distance $D_F$ of the face plate 18 provides an offset from the external surface of the support structure 5 that extends the foot-engaging and/or hand-engaging portion of the step bolt 30 horizontally beyond the upper and lower fastener bolts 23 and 24. In this manner, the area above the step bolt 30 is not obstructed by the upper and lower fastener bolts 23 and 24, thereby facilitating placement of a worker's foot or hand on the step bolt without unwanted contact with the fastener bolts.

The components of the combination step bolt and fall protection anchorage assembly 10 of the present invention may be made from any suitable materials known to those skilled in the art. For example, the anchor plate 12 and integrated anchorage clip 14 may be made from steel, aluminum, composite polymer material or the like.

Figure 9:
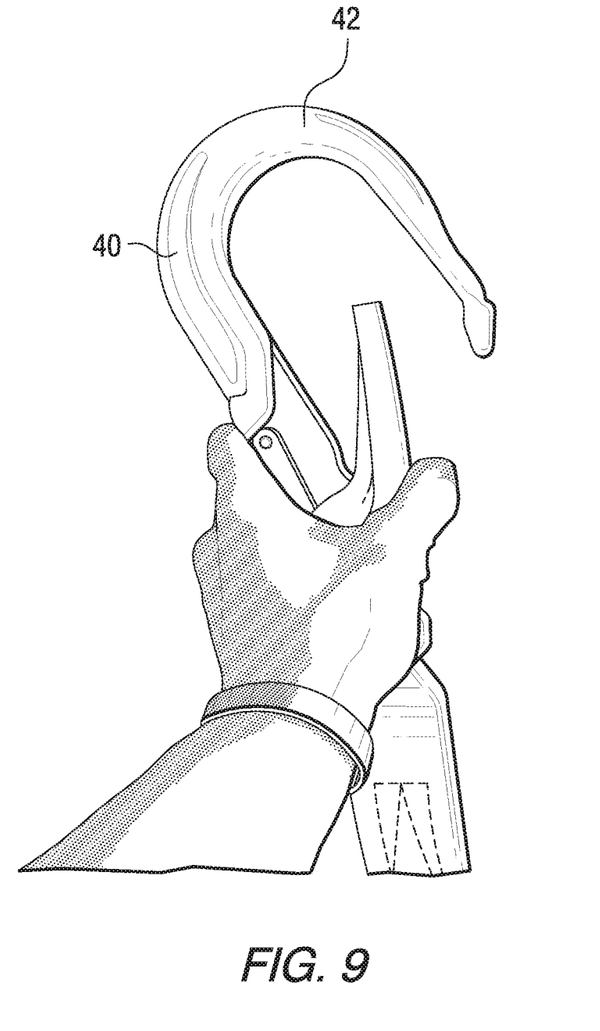
FIG. 9 illustrates a safety hook that may be used with a combined step bolt and fall protection anchor assembly in accordance with an embodiment of the present invention.

FIGS. 9 and 10 illustrate a safety hook 40 that may be used with the assembly 10 in accordance with an embodiment of the present invention. As shown in FIG. 10, an engagement portion 42 of the safety hook 40 may be installed through the hook holes 28 of the first and second side panels 15 and 16. The U-shaped integrated anchorage clip 14 may comprise a single or multiple fall protection anchorage holes 28 for receiving the climbing lanyard safety hook 40 as a fall protection anchorage point. The available mounting options made possible by the combination step bolt and fall protection anchorage assembly 10 allows the assembly to be bolted directly to the structure in lieu of welding. As understood by those skilled in the art, the safety hook 40 is secured to conventional safety strap and harness equipment (not shown) to provide increased safety for workers servicing the support structure 5.

The side anchorage holes 28 thus serve as a fall protection anchorage for attaching the climbing lanyard safety hook 40. The integrated anchorage clip 14 may be symmetrical around the step bolt hole in the front face, which provides a technician easy access to the side anchorage holes 28 regardless of which side of the combination step bolt and fall protection anchorage assembly 10 they approach. This arrangement consistently provides the technician with access to the side anchorage holes 28 without having to reach under and/or work around the step bolt 30. The safety hook may engage both legs of the U-shaped step bolt clip 14 to provide two points of support and distribute the weight of the technician across the combination step bolt and fall protection anchorage, thus ensuring that the assembly 10 can support the technician. The vertical distance between the step bolt hole 26 on the front face 18 and the side anchorage holes 28 may also allow the safety hook 40 to be easily inserted into the combination step bolt and fall protection anchorage assembly 10 without interference from the step bolt 30.

Thus, in accordance with the present invention, the integrated anchorage clip 14 secures the step bolt 30 at one location and provides an integrated fall protection anchorage point for the safety lanyard hook 40 at another point. The integrated anchorage clip 14 may also provide a more substantial engagement between the step bolt 30 and the mounting plate 12. The two legs of the integrated anchorage clip 14 provide at least two points of engagement with the plate 12.

An advantage of the present invention is that the integrated side fall protection anchorage holes 28 may be provided below the step bolt 30 to provide unobstructed access to the step bolt and fall protection anchorage. However, the side fall protection anchorage holes can be placed in other locations relative to any bolt. This arrangement provides for convenient access to fall protection anchorage points when the technician is climbing. In accordance with an embodiment of the present invention, when the technician is reaching for a grip/handhold on the step bolt above the technician, the side anchorage holes being located under the step bolt allows the technician to easily insert the safety hook into the combination step bolt and fall protection anchorage before grabbing the step bolt.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application and the appended claims, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. An assembly for a user to climb a structure using a safety hook, the assembly comprising:
    a plate having at least one mounting feature configured to mount the plate adjacent the structure, and the plate having a first bolt hole spaced from the at least one mounting feature, wherein the at least one mounting feature comprises at least one mounting hole extending through the plate;
    an anchorage affixed to the plate and having at least one hook hole, the at least one hook hole configured to be engaged by the safety hook, the anchorage comprising at least one side panel, a face of the anchorage being disposed a first distance from the plate, the first distance being equal to a width of the at least one side panel, the face having a second bolt hole; and
    a bolt having a first end, an intermediate portion, and a second end, the first end disposed in the first bolt hole of the plate, the intermediate portion disposed through the second bolt hole of the face of the anchorage, the second end extended a second distance from the face of the anchorage,
    wherein the at least one side panel of the anchorage comprises first and second side panels affixed to the plate and extending therefrom, the face being a third panel extending between the first and second side panels, the third panel defining an outer most surface of the anchorage and the second distance of the bolt extends beyond the outer most surface.

2. The assembly of claim 1, wherein each of the first and second side panels has one of the at least one safety hook hole.

3. The assembly of claim 1, further comprising:
    a first nut threaded on the intermediate portion of the bolt and contacting the face adjacent the second bolt hole, and
    a second nut threaded on the intermediate portion of the step bolt and contacting an interior surface of the face adjacent the second bolt hole.

4. The assembly of claim 1, wherein the anchorage is directly affixed to the plate.

5. The assembly of claim 1, wherein the at least one mounting hole configured to receive a fastener to mount the plate adjacent the structure.

6. A structure assembly comprising a plurality of the assembly of claim 1 mounted on the structure for the user to climb the structure using the safety hook.

7. The structure assembly of claim 6, wherein the assemblies are vertically spaced from each other by a distance from 6 to 42 inches.

8. The structure assembly of claim 6, wherein the structure is a communication tower, a pole, or an antenna.

9. The assembly of claim 1, wherein the plate and the anchorage are integrally formed.

10. A combination step bolt and fall protection assembly for a user to climb a structure using a safety hook, the assembly comprising:
    a mounting plate configured to mount adjacent the structure, the mounting plate comprising at least one mounting hole extending therethrough;
    an integrated anchorage clip secured to the mounting plate and comprising at least one safety hook hole extending therethrough, the at least one safety hook hole configured to be engaged by the safety hook, the integrated anchorage clip comprising at least one panel and the at least one safety hook hole extending through the at least one panel, a face of the integrated anchorage clip being disposed a first distance from the mounting plate, the first distance being equal to a width of the at least one panel; and
    the step bolt secured to the integrated anchorage clip and extending in a direction away from the mounting plate, the step bolt defining an exposed length that extends in the direction away from the mounting plate and beyond an outer most surface of the integrated anchorage clip, wherein the at least one panel of the integrated anchorage clip comprises two panels secured to the mounting plate, and the face of the integrated anchorage clip is a face plate extending between the two panels, and the face plate defines the outer most surface of the integrated anchorage clip.

11. The assembly of claim 10, wherein each of the two panels has one of the at least one safety hook hole extending therethrough, the face plate comprises a step bolt hole extending therethrough, and the step bolt extends through the step bolt hole of the face plate.

12. The assembly of claim 11, further comprising an exterior threaded nut threaded on the step bolt and contacting the outer most surface of the face plate, and an interior threaded nut threaded on the step bolt and contacting an interior surface of the face plate.

13. The assembly of claim 12, wherein a threaded end of the step bolt extends into a step bolt hole extending at least partially through the mounting plate.

14. The assembly of claim 10, wherein the integrated anchorage clip is welded to the mounting plate by at least one weld.

15. The assembly of claim 10, wherein the at least one mounting hole being structured and arranged to receive a fastener bolt for securing the assembly to the structure.

16. A combination step bolt and fall protection assembly for a structure, the assembly comprising:

a mounting plate configured to mount adjacent the structure, the mounting plate comprising at least one mounting hole extending therethrough;

an anchorage comprising at least one safety hook hole extending therethrough, the anchorage configured to be secured to the structure via the mounting plate; and the step bolt secured to the anchorage and extending away from the structure beyond an outer most surface of the anchorage, thereby defining an exposed length of the step bolt, wherein the anchorage comprises two panels secured to the structure, and a face plate extending between and joining the two panels to form a channel of the anchorage, the face plate of the anchorage being disposed a first distance from the mounting plate, the first distance being equal to a width of at least one of the two panels, wherein at least one of the two panels has the at least one safety hook hole extending therethrough, the face plate comprises a step bolt hole extending therethrough, and the step bolt extends through the step bolt hole of the face plate.

17. The assembly of claim 16, wherein the face plate defines the outer most surface of the anchorage.

18. The assembly of claim 16, further comprising an exterior threaded nut threaded on the step bolt and contacting the outer most surface of the face plate, and an interior threaded nut threaded on the step bolt and contacting an interior surface of the face plate.

19. The assembly of claim 18, wherein a threaded end of the step bolt extends into a step bolt hole extending at least partially through the structure.

* * * * *